Aug. 11, 1931. B. S. AIKMAN 1,817,903
STEERING DEVICE
Filed Nov. 28, 1927 6 Sheets-Sheet 1

Witness:
William P. Kilroy

Inventor:
Burton S. Aikman
By Brown, Boettcher + Dienner
Attys

Aug. 11, 1931.  B. S. AIKMAN  1,817,903
STEERING DEVICE
Filed Nov. 28, 1927  6 Sheets-Sheet 2

Witness:
William P. Kilroy

Inventor:
Burton S. Aikman

Aug. 11, 1931.  B. S. AIKMAN  1,817,903
STEERING DEVICE
Filed Nov. 28, 1927    6 Sheets-Sheet 3
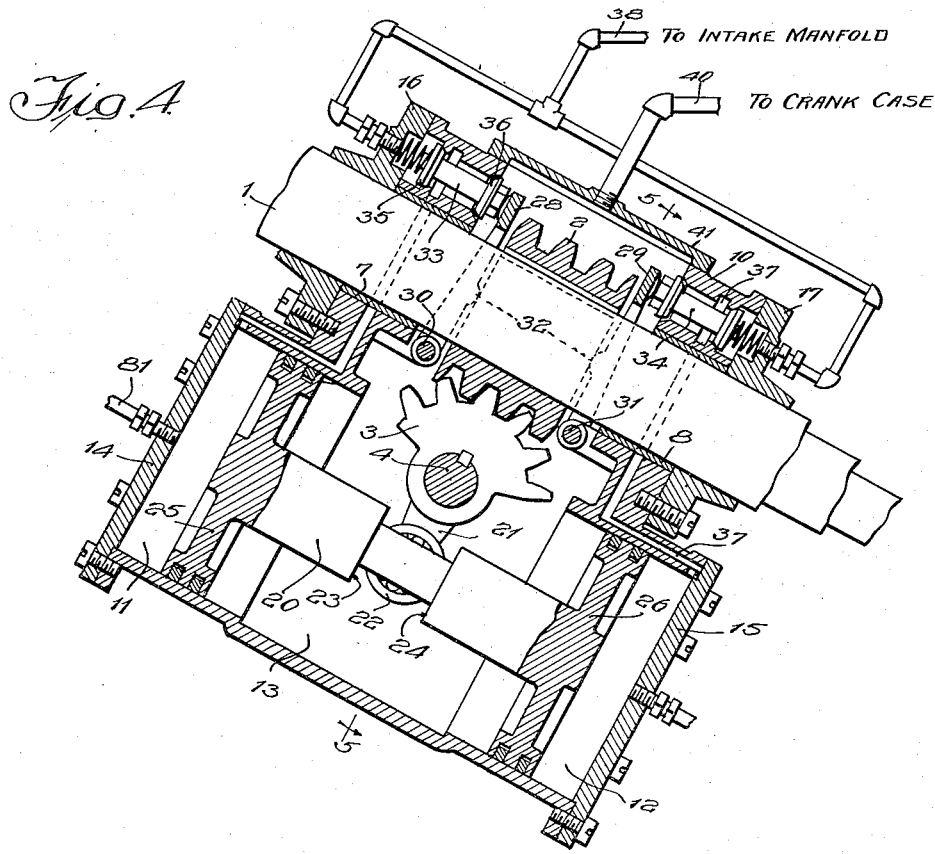
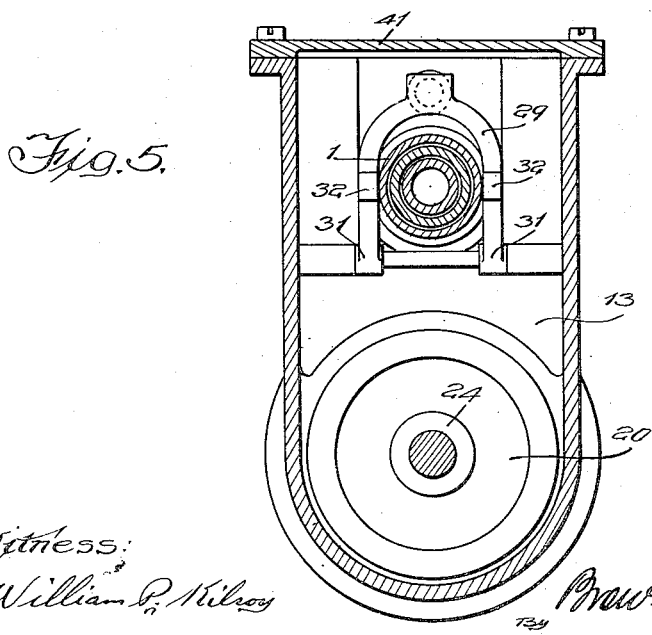
Inventor
Burton S. Aikman Aug. 11, 1931. B. S. AIKMAN 1,817,903
STEERING DEVICE
Filed Nov. 28, 1927 6 Sheets-Sheet 4
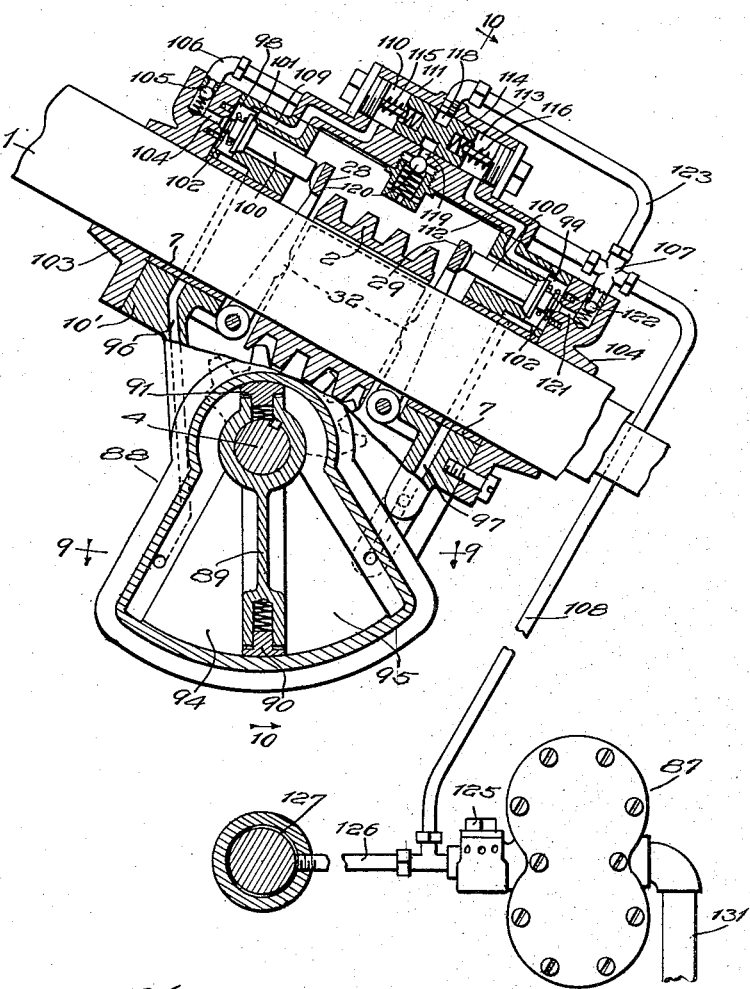
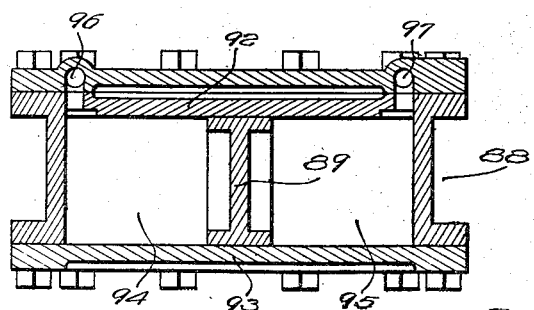
Witness:
William P. Kilroy
Inventor:
Burton S. Aikman

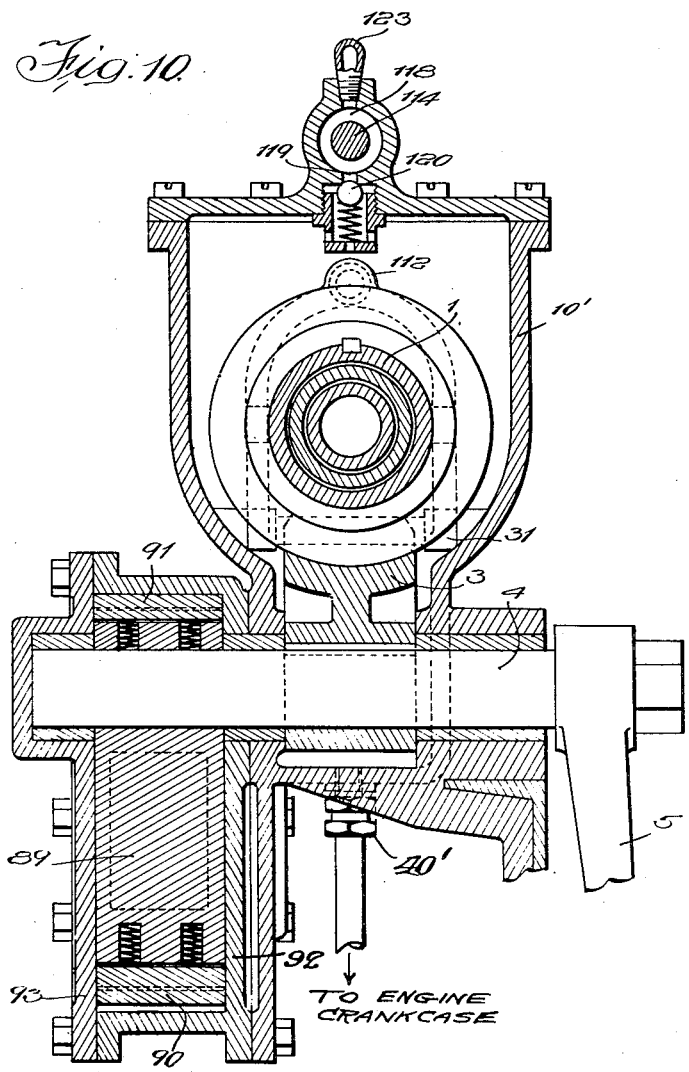

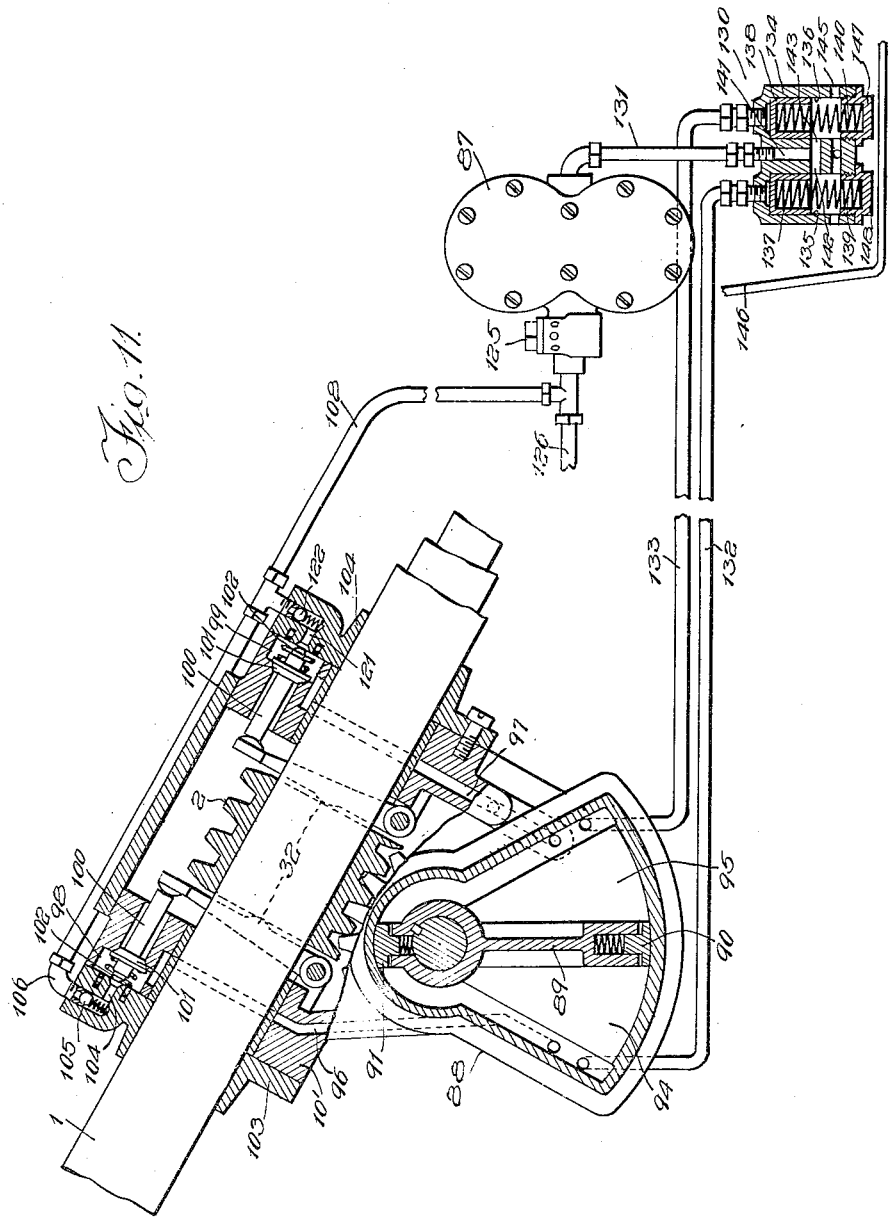

Patented Aug. 11, 1931

1,817,903

UNITED STATES PATENT OFFICE

BURTON S. AIKMAN, OF MILWAUKEE, WISCONSIN, ASSIGNOR OF ONE-HALF TO R. P. TELL, OF MILWAUKEE, WISCONSIN

STEERING DEVICE

Application filed November 28, 1927. Serial No. 236,311.

My invention relates to power steering mechanisms employing fluid pressure operated means under the control of the operator to perform a part or all of the work of turning the steering wheel of an automobile or the rudder of a ship or the like steering mechanism in a power operated conveyance.

One phase of my invention comprehends an improved valve control for the fluid pressure motor which operates the steering mechanism. Preferably, I permit the worm on the steering wheel shaft to have a limited longitudinal motion and cause this motion to operate the said control valve. As will be apparent later, this same motion, i. e., the endwise motion of the worm from the given neutral position which is under the control of the operator, is employed to release the fluid locking of the steering mechanism.

According to another phase of my invention, the pressure actuated mechanism for shifting the position of the steering wheel is supplemented with means for locking the steering mechanism in a desired place or position independently of the operating means. When power actuated steering mechanism is to be employed, it is desired to have a relatively lower ratio of worm to sector than is employed in manual steering only, so that the steering operation may be performed more rapidly. While this tends to let the motion of the wheels be made more rapidly, it also tends to permit the reaction of the steering mechanism to operate through the worm and sector, and such reaction must be resisted by the driver, with the result that steering is tiresome. In heavy duty trucks and the like, this tendency is very pronounced.

In the type of power operated steering mechanism to which my invention belongs, the control valves are shifted by turning of the steering shaft and a consequent endwise movement of the worm, which can float a short distance. Since the endwise shifting of the worm actuates the valves, it will be seen that any reaction of the wheels also acts upon the worm and tends to shift it.

According to my invention, a hydraulic lock or stabilizer is used to render the steering mechanism insensitive to road shocks, but sensitive to manual control. Even if the power operation is not employed and if something should go wrong with the same, the wheels of the vehicle can be turned and guided by hand, and the hydraulic lock is operative. In fact, the hydraulic lock may be employed independently of power steering.

The power operated motor may be driven by a vacuum from the engine, and I have illustrated one embodiment employing the same. It may be actuated by oil pressure from the lubricating system of the engine. This has certain advantages, such, for example, as the ability to increase the speed of turning the steering wheel by accelerating the engine. Also, if the oil should run too low, the vehicle would steer hard and this would give notice of danger of lack of lubrication.

I may also arrange suitable controls for the pressure or delivery of oil from the oil pump, to increase the power of the oil operated motor when desired, as will be more fully described hereinafter.

Obviously, instead of a hydraulic lock, such as is here shown, I may employ any other preferred type of locking device or stablizer, and instead of having the same act upon the worm or sector, or immediately adjacent parts, I may arrange the same to operate at any suitable or convenient part of the steering mechanism.

Now, in order to acquaint those skilled in the art with the manner of constructing and operating a device embodying my invention, I shall describe in connection with the accompanying drawings a specific embodiment of the same.

In the drawings:—

Fig. 3 is an elevational view taken from the rear of an automobile looking forward showing a vacuum operated power steering mechanism with a separate stabilizer;

Fig. 4 is a vertical section through the same taken on the line 4—4 of Fig. 3;

Fig. 5 is a transverse section of the device shown in Fig. 4, taken on the line 5—5 of Fig. 4;

Fig. 6 is a plan view of the stabilizing mechanism;

Fig. 7 is a section taken on the line 7—7 of Fig. 6;

Fig. 8 shows a power operated steering mechanism employing oil pressure from the lubricating pump of the engine, the power operated steering mechanism being shown in vertical section;

Fig. 9 is a fragmentary section on the line 9—9 of Fig. 8 showing the oil operated motor;

Fig. 10 is a transverse section taken on the line 10—10 of Fig. 8; and

Fig. 11 is a modified oil pressure power steering system in which the oil pressure is varied by varying the displacement of the pump.

Figure 1:
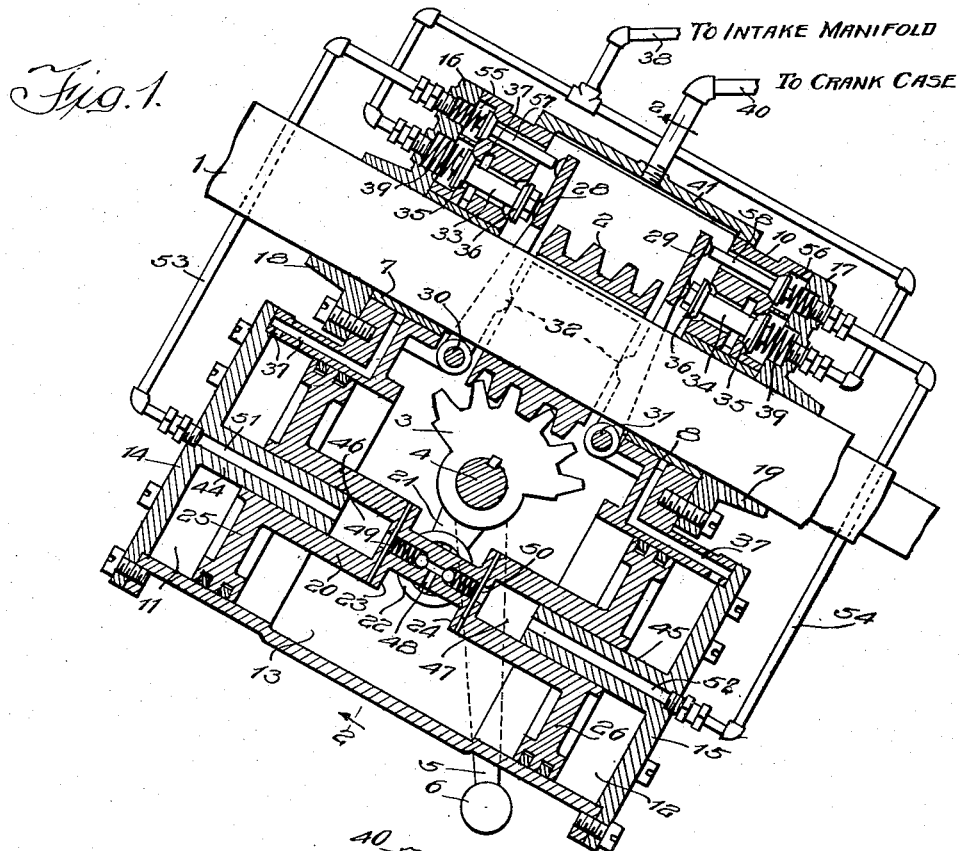
Fig. 1 is a vertical longitudinal section of a vacuum operated power steering device employing the hydraulic locking mechanism.
Figure 2:
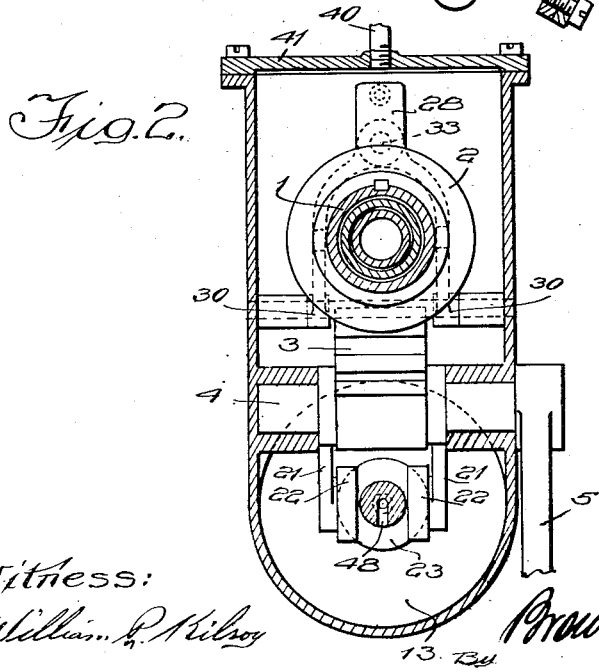
Fig. 2 is a transverse cross-sectional view taken on the line 2—2 of Fig. 1.

I shall now refer to the device shown in Figs. 1 and 2. This device is a power operated steering mechanism operated by vacuum of the engine to perform a part or all of the work of moving the steering wheel of the vehicle.

The steering wheel shaft 1 is provided with the usual steering wheel in the hands of the operator and this shaft 1 has a worm 2 keyed thereto for limited endwise movement, but rigid for rotational movement.

The worm 2 engages a sector 3 mounted on a shaft 4 and keyed thereto. A steering arm 5 has a ball connection 6 to a drive link (not shown) for operating the dirigible wheels or other steering mechanism of the vehicle.

The steering shaft 1 is supported in bearings 7—8 in a frame or casting 10, the lower part of which is enlarged to provide a pair of cylinders 11 and 12 having a common connecting chamber 13 between them. The upper part of the casting or frame 10 contains valve mechanism, hereinafter referred to, on each side of the worm 2. The cylinders 11 and 12 are closed at their outer ends by head members 14—15, and, likewise, the valve portions have cover members 16 and 17 which embrace the steering shaft 1 as indicated at 18—19 and hold the bearings in position.

A double piston structure 20 is connected to the sector 3 and shaft 4 by means of a short arm 21 which has an anti-friction roller member 22 disposed between the shoulders 23 and 24 formed on the connecting stem between the pistons 25 and 26 so that the piston structure 20 and the shaft 4 with their connected parts are solidly secured together.

The worm 2 lies between two rocker arms 28 and 29 which are pivoted at 30 and 31, respectively, to the main frame member 10. These rocker arms 28, 29 have short projections 32 adapted to be engaged by the worm 2 to actuate the rocker arms.

The rocker arms control the double bead valves 33 and 34 controlling the application of vacuum or atmospheric pressure to the cylinders 11 and 12. The double bead valve 33 has a valve member 35 normally held against its seat to close off the passageway 37 from the vacuum connection 38. The valve is held in this position by a compression spring 39 strong enough to hold the valve on its seat against suction. The passageway 37 leads down through the main frame member 10 to the cylinder 11, and when the valve 33 is in the position shown said cylinder is opened to atmosphere, since the interior of the main frame member 10 is connected to the engine crank case by a connection 40 which extends through the cover member 41.

The double bead valve 34 is constructed like valve 33 and it also controls communication with the vacuum connection 38.

From the above it can be seen that by turning the steering shaft 1 in a clockwise direction to steer the vehicle to the right, the worm 2 will first be forced to the left, as viewed in Fig. 1, acting upon the lever 28 to shift the valve 33, closing off connection with the atmosphere from the cylinder 11 and opening the connection to the valve member 35 to the intake manifold of the engine whereby suction is imposed upon the cylinder 11, this tending to pull the piston 25 to the left, as viewed in Fig. 1, and swinging the gear sector 3 in a clockwise direction, tending to pull the arm 5 back and thus direct the wheels off to the right.

It will be appreciated that the movement of the piston structure 20 as above described will rotate the gear sector 3 slightly in a clockwise direction with the result that the worm 2 is pushed to the right, as viewed in Fig. 1, permitting the valve 33 to shift to close the valve member 35 and open the valve member 36. In other words, the movement of the motor mechanism is in response to the manual operation of the worm 2, and as soon as the desired movement has been made, the device reaches the neutral position.

Likewise, in turning the vehicle to the left, the valve 34 is operated and the movement of the steering arm 5 is in the opposite direction.

Now, I wish to call attention to the fact that any tendency of the dirigible wheels to react through the arm 5 would tend to shift the worm 2 and operate the aforesaid valves if no further means were present. This is because the air in the cylinders 11—12 is readily compressible and, hence, there would be a tendency for the irregularities of the road constantly to react through the sector 3 to shift the worm 2 to operate the valves 33—34. I have provided, however, a locking mechanism which prevents this.

The cylinder heads 14 and 15 have projecting stems 44 and 45 sliding in bores 46 and 47 formed in the connecting stem between the two pistons 25 and 26. These hollow bores 46 and 47 constitute movable cylinders which at all times are maintained full of oil.

The cavity 13 is filled with a suitable grade of lubricating oil and a T-shaped passageway is formed in the connecting stem to permit the introduction of oil into the cylinders 46 and 47. This T-shaped passageway comprises the common inlet 48 and the lateral branches 49 and 50, in which there are arranged suitable inlet check valves to permit the flow of oil in through the passageway 48 and past the corresponding check valve into either cylinder 46 or 47, as the case may be, depending upon the direction of movement of the piston structure 20.

The stems or pistons 44, 45 are hollow to provide passageways 51 and 52 leading through suitable connecting ducts 53 and 54, shown in this case as small copper pipes. These pipes 53 and 54 lead to valve chambers 55 and 56 in the upper part of the main frame casting 10 and small poppet valves 57 and 58 control communication of the valve boxes 55 and 56 with the interior space.

The levers 28 and 29 are adapted to engage the stems of the valves 57 and 58 to open the same at the time that the valves 33 and 34 are shifted to secure the application of fluid pressure difference to the fluid pressure operated motor.

The valves 57 and 58 are held to their seat by springs, and these valves face in a direction to trap the pressure within the cylinders 46 and 47.

A body of oil is contained in the bottom of the cavity 13 in such a position that it always covers the inlet 48, permitting oil to be drawn into the cylinders 46 or 47 and receiving the oil discharged from one of said cylinders when the piston structure is moved.

With the parts shown in the position indicated in Fig. 1, assume that the vehicle is moving straight ahead, it will now be seen that the cylinder 46 and the cylinder 47 being both full of oil and the valves 57 and 58 being closed and facing in a direction to be seated more firmly by internal pressure, any road shocks transmitted to the steering arm 5 through the drag links, will be incapable of moving the gear sector 3 and, hence, the worm 2, since the piston structure 20 is locked in position by the incompressible liquid trapped in the cylinders 46 and 47.

If, now, the operator wishes to steer to the right. the steering wheel is turned in a clockwise direction. the shaft 1 thereby rotating the worm 2 and tending to move it endwise to the left as viewed in Fig. 1, whereupon, the lever 28 shifts the valve 33 to closed position, and, at the same time, the valve 57 is opened. As a result, suction is imposed on the cylinder 11 and the hydraulic cylinder 46 is free to discharge its contents through the passageway 51, pipe 53, past the valve 57 into the cavity within the device. As a result the piston structure moves over to the left. As it does so the movement of the cylinder 47 to the left draws liquid in through the intake passageway 48 past the corresponding check valve, through the branch connection 50 into the cylinder 47.

The resulting movement of the piston structure shifts the steering arm 5, the drag link and the dirigible wheels to a point where the worm 2 is brought to its central position, the valve 33 being shifted again to its normal position, and the valve 57 closing to trap the hydraulic pressure in the cylinder 46, with the result that the steering device is now locked in the shifted position.

Continuous movement of the worm 2 to keep the valve 33 and the valve 57 in off-normal position, will result in a continuous movement of the piston structure and consequent continuous movement of the steering mechanism.

The worm 2, therefore, becomes a mere control element for controlling the operation of the motor mechanism and the locking mechanism.

However, it is possible to operate the steering mechanism, even if the engine is not running. This is possible because the worm 2 is an actual operating device for the sector 3 and the connected parts. Hence, even if the vehicle were being towed or moved without operation of the engine, it would still be possible to steer the vehicle manually.

The stabilization of the steering gear is a highly desirable function. It may be secured automatically by the use of means acting at a different point from that which I have disclosed, and it need not operate hydraulically.

In Figs. 3 to 7 I have shown a power stabilizing device operated in conjunction with power operated steering mechanism, but acting at a separate point.

In this case, the mechanism shown in Figs. 4 and 5, which comprises the power operating mechanism, is like that shown in Figs. 1 and 2, except that the hydraulic locking or stabilizing mechanism has been omitted. The piston structure 20 is adapted to be moved in the cylinder 11—12 and to impart its motion to the gear sector 3, the shaft 4 and the steering arm 5. The motion of the arm 5 is transmitted through a drag link (not shown) and through an operating arm 59 connected to the hub 63 of the spindles which bear the dirigible wheels 60 and 61. The hubs 63 and 64 have arms 65 and 66 which are connected together by a tie rod 67 which has a flattened portion 68 at the central portion of the same. This central portion 68 is adapted to be gripped between two jaws 69 and 70 which have fibrous friction faces.

The movable jaw 69 is pivoted at 71 to the relatively stationary jaw 70, which stationary jaw is supported on a bracket arm 72 clamped to the bottom of the axle 73. The movable jaw 69 has an upwardly extending arm 74 with pins 75—75 extended out laterally and lying within the hooked ends 76 of the piston rods 77.

Two operating cylinders 78 and 79 are provided, each containing a piston 80 connected to the corresponding piston rod 77. A fluid pressure connecting pipe 81 provides communication between the cylinder 78 and the cylinder 11 of the power operated steering motor. Likewise, the pipe 82 provides communication between the cylinder 79 and the cylinder 12 of the steering motor.

The movable jaw 74 has a spring 85 bearing between the bracket arm 72 and at extension 84 on the arm 69 for urging the two jaws 69 and 70 into clamping engagement with the flattened portion of the tie rod 67.

Now it can be seen that when atmospheric pressure prevails in both cylinders 78 and 79, the clamping spring 85 causes the jaws 69 and 70 to grip the portion 68 of the tie rod to stabilize the steering gear.

Application of vacuum to either cylinders 78 or 79 releases the clamping jaws 69 and 70 and permits the tie rod to shift.

The operation of the device is as follows:—

Assume that the operator intends to turn to the right, he moves the control shaft 1 in a clockwise direction and this results in an endwise movement of the worm 2, shifting the valve 33 to open the valve member 35 and close the valve member 36 so that suction is thereupon applied to the cylinder 11 causing the piston structure 20 to move to the left and, at the same time, causing suction to be applied to the cylinder 78 to release the clutching engagement of the jaws 68 and 69 upon the tie rod 67. The piston structure 20 operates the drag link and turns the steering spindle to a point where the motion of the sector 3 moves the worm 2 back into neutral position. Continuous turning of the control shaft 1 will result in continuous movement of the steering gear.

As soon as the worm 2 has been moved to the neutral or intermediate position, the valve member 33 is shifted to the position shown in Fig. 4, whereupon atmospheric pressure is admitted to the cylinder 11 and to the release cylinder 78, whereupon the jaws 69 and 70 again clamp the tie rod and hold the steering gear in the predetermined position.

The operation of either piston 80 in the cylinder 78 or 79 is able to release the clamping pressure, since the hook members 76 provide sufficient lost motion to permit either one to apply or release the clamping jaws 69—70.

In the form shown in Figs. 8, 9 and 10, oil pressure from the lubricating pump 87 is employed to do the work of moving the steering gear. The control shaft 1 has the worm 2 keyed thereto for rotary motion, but also arranged to permit a limited endwise motion. This worm meshes with the gear sector 3 keyed to the shaft 4 which is in turn connected to the steering arm 5 as previously described. The main frame member 10' in this case has a cylinder member 88 at the lower end thereof and a housing for the controlling valves in the upper end thereof. The cylinder member 88 contains the moving vane member 89 which is adapted to be moved by a fluid pressure difference in either direction.

The vane 89 has packing plates 90 and 91 bearing against concentric portions of the casing 88 and the sides of the vane 89 bear against the side walls 92 and 93 to form two chambers 94 and 95 corresponding to the cylinders 11 and 12. A passageway 96 leads from the chamber 94 to the valve chamber 98 and, similarly, the passageway 97 leads to the valve chamber 99. The worm 2 is disposed between the levers 28 and 29, and these levers bear against the valve stems 100—100. Each valve stem 100 has an exhaust valve member 101 and an admission valve member 102 adapted to engage spaced seats. The seat for the exhaust valve is formed in the main frame member 10' and controls the passageway leading to the interior of the frame member along the valve stem 100.

The admission valve 102 has a valve seat carried in the cap member 103, which member contains a port 104 leading past an inlet check valve 105 to a connecting pipe 106 which leads through the T connection 107 to the discharge of the oil pump 87 through the pipe 108.

The valve box 98 communicates by way of a passageway 109 to the chamber 110 formed at one end of the cylinder member 111.

Likewise, the valve chamber 99 communicates by a passageway 112 to a chamber 113 formed in the opposite end of the cylinder member 111. A piston valve member 114 plays in said cylinder 111, being held normally centralized by the compression springs 115 and 116.

The central part of the piston valve 114 has a circumferential groove 118 communicating with a discharge passageway 119 past the check valve 120 into the interior of the hollow casting 10'. The interior of the main frame 10' is connected to the engine crank case by a connection 40'.

The control valves above described having the exhaust valve 101 and admission valve 102, are held by compression springs in the position shown in full lines in Fig. 8 with the exhaust valve member 101 seated over the exhaust port. Both of these valves are alike in structure and mode of operation.

The control valve at the right, which is contained in the valve chamber 99, has an admission valve 102 controlling an admission valve seat and an inlet port 121 communicating through an inlet check valve 122 with the oil supply pipe 108 through the T connection 107.

The T connection 107 has a pipe 123 leading through the central part of the cylinder 111 in such position as normally to register with the circumferential groove 118 to permit oil under pressure to be delivered to the discharge port 119 except when the piston valve 114 is moved to the right or to the left to take the groove 118 out of register with the discharge port 119.

The oil pump 87 has a loaded release valve 125 which is loaded to retain a higher pressure than the valve 120. The delivery of the oil pump 87, in addition to being connected to the pipe 108 and thence to the power operated steering mechanism, has connection such as 126 leading to the bearings 127 of the engine.

The release valve 120 is set to release at a lower pressure than the valve 125, so that, normally, the proper lubricating pressure is maintained by the valve 120.

The operation of the system is as follows:—

Assume that the operator intends to direct the vehicle to the right, he gives the steering control shaft 1 a clockwise motion to the desired degree. This turns the worm 2 and causes it to be moved endwise, for example to the left as viewed in Fig. 8, thereby opening the discharge valve 101 and closing the admission valve 102 in the valve chamber 98.

The system of Fig. 8 stands normally under pressure, that is to say, the pressure of the oil as retained by the valve 120 is delivered past the inlet check valves 105 and 122 to the opposite sides of the vane 89, that is, in the chambers 94 and 95, so that the vane is held relatively immovable against road shocks. As soon as the left hand control valve is shifted to the exhaust position, as above described, the pressure in the chamber 94 and in the chamber 110 is permitted to escape, with the result that the piston valve 114 immediately moves to the left, as viewed in Fig. 8, cutting off the discharge port 119, raising the pressure in the system to the pressure to which the loaded release valve 125 has been set at the same time the increased pressure is applied only to the chamber 95, since the admission valve 102 in the right hand valve in chamber 99 is opened. As a result, the vane 89 moves clockwise, moving the steering wheel in the desired direction and, at the same time, shifting the worm 2 toward its central neutral position, whereupon the exhaust valve at the left is closed and its corresponding admission valve is opened, permitting full pressure again to be applied to the chamber 94 and permitting the piston valve 114 to be centered so that the passageway 118 thereof registers with the discharge port 119 and the valve 120 is then permitted to regain control of the pressure in the system.

Movement in the opposite direction is accomplished in a similar manner.

Since the system stands normally full of oil at the normal pressure of the lubricating system, the vane 89 is held by the hydraulic connection in fixed position. That is to say, the vane 89 cannot be moved quickly, as by road shocks, since the chambers 94 and 95 are full of oil at the same pressure, and the outlet connections are all closed, as by the check valves 105 and 122.

In the system shown in Fig. 11, I have provided means for regulating the displacement of the pump 87 to secure the desired pressure during movement of the steering gear.

Whereas, in the form shown in Figs. 8, 9 and 10, the normal oil pressure for supplying the bearings of the engine is secured through the overflow valve 120, and the maximum pressure is limited by the loaded valve 125. The system of Fig. 11 provides means for choking the intake of the pump to maintain the normal oil pressure on the lubricating system of the engine, while the power steering apparatus is not in use, and then to raise the pressure of the oil system during the time that the power steering mechanism is in operation.

In the system of Figs. 8 to 10, the normal lubricating pressure is of the order of 20 pounds, whereas, the release pressure of the loaded valve 125 is of the order of 50 pounds. This permits of a relatively compact and powerful unit. This relation between normal lubricating pressure and operating pressure is maintained in the system of Fig. 11 through the use of the inlet choke valve mechanism 130.

The delivery pipe 108 leading from the pump 87 delivers oil under suitable pressure through the check valves 105 and 122 past the inlet valves 102—102 through the passageways 96 and 97 into the chambers 94 and 95 upon opposite sides of the vane or piston 89. The oil pressure prevailing in said chambers 94 and 95 holds the vane in fixed position. The chambers 94 and 95 are connected through pipes 132 and 133 to the choker valve 130. This choker valve comprises a body member 134 containing two cylindrical bores 135 and 136 in which are arranged to move two piston valves 137 and 138. These piston valves 137 and 138 are held in their uppermost position by springs 139 and 140 when the device is at rest and not under pressure. The intake pipe 31 of the pump 87 leads down through a passageway 141 which connects by lateral branches 142 and 143 with the interior of the cylinders 135 and 136. The pistons 137 and 138 are adapted to overrun the ports formed by the passageways 142 and 143 in the side of the cylinder walls 135 and 136.

The bottom part of the casting 134 has a plurality of inlet openings 145 through which oil may be drawn by the intake of the pump 87.

The operation of the system shown in Fig. 11 is as follows:—

Assume that the operator wishes to steer the vehicle to the right, he turns the control shaft 1 in a clockwise direction, thereby turning the worm 2, and, due to its engagement with the sector 3, the worm 2 is forced to the left as viewed in Fig. 11, opening the exhaust valve 101 and closing the inlet valve 102 in the valve box 98, thereby shutting off pressure from the chamber 94 and connecting the chamber 94 to atmospheric pressure. At the same time, the pressure in the chamber 94 permits the choker valve to operate as follows, namely, the spring 139 forces the piston valve 137 upwardly, since the pressure in the cylinder 94 and, hence, in pipe 132 has been released.

With this upward movement of the piston valve 137 the inlet passageway 142 of the pump is wide open and the pump will develop full pressure within the limit of the setting of the loaded release valve 125. The pressure thereupon rises to maximum and discharges past the intake valve 102 in the valve chamber 99, passageway 97 and into the chamber 95. The pressure in the chamber 95 is transmitted through the pipe 133 to the top of the piston valve 138, and this piston valve is held down in its lowermost position against the cap 147 which closes the lower end of the bore. However, closing off the passageway 143 by the piston valve 138 is ineffective, since the passageway 142 is wide open.

The discharge of pressure into the chamber 95 shifts the vane 89 to the left, as viewed in Fig. 1, whereby the worm 2 is shifted to the right and into neutral position unless the shaft 1 is further turned. As soon as the worm 2 reaches neutral position, the left hand control valve is shifted to its normal position as shown in Fig. 11, whereupon the exhaust valve 101 is closed and the inlet valve 102 is opened and the pressure of the oil from the pipe 108 is discharged into the chamber 94 through the passageway 96. This pressure is transmitted through the top of the piston valve 137 by pipe 132, said piston valve being thereupon lowered to choke off the inlet passageway 142, thereby reducing the displacement of the pump 87 and bringing the pressure down to a point where the setting of the springs 139 and 140 is just opposed sufficiently to permit oil to enter the passageways 142 and 143 to secure the desired displacement to maintain the predetermined pressure of approximately 20 pounds per square inch in the lubricating system and in the power steering device.

This relieves the pump 87 from pumping constantly against the false head.

The oil which is discharged through the exhaust valve 101 into the hollow interior of the power steering mechanism is drained by gravity back into the crank case, which is indicated in part by reference numeral 146.

It will be apparent to those skilled in the art that I do not intend to be limited to the details shown and described.

I claim:—

1. In a power operated steering mechanism, a worm shaft, a worm having limited axial motion thereupon, a gear sector engaged by the worm, steering means connected to the sector, a fluid pressure motor connected to said sector and a valve controlling the motor and actuated by operation of said worm.

2. In combination, a control shaft, a gear member on the control shaft, steering mechanism, a second gear cooperating with the first gear, mechanical operating connections between said steering mechanism and said second gear, said first gear having limited motion with respect to said shaft, a balanced piston motor for operating the second gear and thereby operating the steering mechanism, and valve means controlled by the limited motion of said first gear for controlling the application of fluid pressure to said balanced piston motor.

3. In combination, a steering wheel shaft, a helical gear member connected to the shaft, a cooperating gear member, a steering member actuated by said cooperating gear member, locking means for locking the steering member, and control means independent of the steering member and governed by the actuation of said steering wheel shaft for controlling said locking member independent of the steering member to release the steering member.

4. In combination, a steering wheel shaft, a worm gear mounted on said shaft for rotary motion therewith, said worm gear having an independent axial motion, a gear sector cooperating with the worm, vehicle steering means connected to the gear sector, a hydraulic chamber, a movable member disposed in and dividing said chamber, said movable member being connected to the gear sector, and valve means under the control of said worm gear for controlling the hydraulic pressure on opposite sides of said movable member.

5. In combination, a steering wheel shaft, a worm gear thereon having limited endwise motion, hydraulic locking means comprising a movable member, bodies of liquid trapped on each side of the movable member, a gear sector meshing with the worm and connected to said movable member, and valve means under the control of the worm for controlling the trapped body of liquid.

6. In a motor vehicle, the combination with a lubricating system of the motor of a power operated steering mechanism, said steering mechanism comprising a hydraulic motor member, means controlling the application of pressure to said member, and means governed by the said controlling means for raising the pressure in said lubricating system.

7. In a motor vehicle, the combination with a lubricating system of the motor of a power operated steering mechanism, said steering mechanism comprising a steering member, a hydraulic motor member, means controlling the application of pressure to said member, means governed by the said controlling means for raising the pressure in said lubricating system, and means actuated by said motor member for controlling said controlling means in conjunction with said steering member.

8. In combination with the lubricating system of the engine of a motor vehicle, of a hydraulic power operated steering mechanism, said lubricating system comprising a pump, said power operated steering mechanism comprising a hydraulic motor, control means controlling the application of hydraulic pressure from the lubricating system to said motor, and means controlled by the application of pressure to the hydraulic motor for operating the steering mechanism for regulating the displacement of the pump to increase the pressure in the lubricating system during the application of pressure to the hydraulic motor.

9. In a motor vehicle having steering means and having a driving engine, a hydraulic motor for operating the steering means, the engine having an oil pump for supplying the lubricating system of the engine, a connection from the oil pump to the hydraulic motor, control means for controlling the application of hydraulic pressure to said motor, and a choker valve actuated upon the application of unbalanced pressure to the hydraulic motor for increasing the rate of oil displacement by the lubricating pump.

10. In combination, steering mechanism, a movable member connected to said steering mechanism, means for establishing a normal pressure on each side of said member to hold said mechanism in a fixed position, a steering wheel shaft, means responsive to the movement of said shaft for reducing the pressure on one side of said member, and means responsive to the reduction of pressure on the one side for increasing the pressure on the other side above the normal pressure.

11. In combination, steering mechanism, a movable member connected to said steering mechanism, an enclosure in which said member moves, a fluid pump and connections therefrom to each side of said enclosure, pressure control means for preventing the pressure in said connections from rising beyond a certain value while said pump is operating, a control wheel shaft, means responsive to the operation of said shaft for interrupting the connection from said pump to one side of said enclosure and for reducing the pressure in said enclosure on said one side, and means responsive to the reduction in pressure on said one side for disabling said pressure control means.

12. In combination, a steering mechanism, a movable member controlling said steering mechanism, bodies of liquid trapped on each side of said member under pressure, means for releasing the liquid trapped on one side of said member, and means responsive to the release of the liquid on said one side for increasing the pressure of the liquid on the other side of said member.

13. In combination, a steering mechanism, a fluid pump, two cylinders and a piston in each, one piston controlling said steering mechanism and the other controlling the pressure developed by said pump, passageways connecting the corresponding ends of the two cylinders, connections from the pump to each passageway to maintain equal pressures on both sides of each piston, and a valve in each passageway for closing the connection from the pump and for releasing the fluid in the passageway to unbalance the pressures on the sides of the pistons.

In witness whereof, I hereunto subscribe my name this 25th day of November, A. D. 1927.

BURTON S. AIKMAN